United States Patent
Kahle et al.

(10) Patent No.: US 6,654,869 B1
(45) Date of Patent: Nov. 25, 2003

(54) ASSIGNING A GROUP TAG TO AN INSTRUCTION GROUP WHEREIN THE GROUP TAG IS RECORDED IN THE COMPLETION TABLE ALONG WITH A SINGLE INSTRUCTION ADDRESS FOR THE GROUP TO FACILITATE IN EXCEPTION HANDLING

(75) Inventors: James Allan Kahle, Austin, TX (US); Hung Qui Le, Austin, TX (US); Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,399

(22) Filed: Oct. 28, 1999

(51) Int. Cl.[7] .................................................. G06F 5/00
(52) U.S. Cl. .................... 712/24; 712/215; 712/218; 712/227; 712/209; 712/210; 712/244
(58) Field of Search ................... 712/24, 215, 244, 712/218, 227, 209, 210

(56) References Cited

U.S. PATENT DOCUMENTS

| | | | | |
|---|---|---|---|---|
| 5,075,844 A | * | 12/1991 | Jardine et al. | 712/218 |
| 5,333,280 A | * | 7/1994 | Ishikawa et al. | 712/24 |
| 5,404,557 A | | 4/1995 | Yamashita | |
| 5,826,055 A | | 10/1998 | Wang et al. | |
| 5,896,519 A | * | 4/1999 | Worrell | 712/213 |
| 5,925,124 A | * | 7/1999 | Hilgendorf et al. | 712/209 |
| 5,930,491 A | | 7/1999 | Hilgendorf et al. | |
| 6,108,768 A | * | 8/2000 | Koppala et al. | 712/215 |
| 6,324,640 B1 | * | 11/2001 | Le et al. | 712/215 |

FOREIGN PATENT DOCUMENTS

| | | | | |
|---|---|---|---|---|
| EP | | 454985 A2 | * 11/1991 | G06F/9/38 |
| WO | WO 98/06042 A1 | | 2/1998 | |

* cited by examiner

Primary Examiner—Richard L. Ellis
Assistant Examiner—Tonia L. Meonske
(74) Attorney, Agent, or Firm—Joseph P. Lally; Tom Tyson; Volel Emile (57) ABSTRACT

A microprocessor includes a fetch unit, an instruction cracking unit, and dispatch and completion control logic. The fetch unit retrieves a set of instructions from an instruction cache. The instruction cracking unit receives the set of fetched instructions and organizes the set of instructions into an instruction group. The dispatch and completion logic assigns a group tag to the instruction group and records the group tag in an entry of the completion table for tracking the completion status of the instructions comprising the instruction group. The dispatch and control logic may record a single instruction address in the completion table entry corresponding to the each instruction group. Preferably, the single instruction address is the instruction address of the first instruction in the instruction group. The processor may flush the instruction group in response to detecting an exception generated by an instruction in the instruction group.

17 Claims, 5 Drawing Sheets

| GTAG 308 | instruction address 304 | status 306 |
|---|---|---|
| 302a | | |
| | | |
| 302n | | |

ASSIGNING A GROUP TAG TO AN
INSTRUCTION GROUP WHEREIN THE
GROUP TAG IS RECORDED IN THE
COMPLETION TABLE ALONG WITH A
SINGLE INSTRUCTION ADDRESS FOR THE
GROUP TO FACILITATE IN EXCEPTION
HANDLING

BACKGROUND

1. Field of the Present Invention

The present invention is related to the field of superscalar microprocessors, and more particularly to a processor that utilizes instruction groups to improve performance and includes facilities for handling exceptions generated by instructions within the groups.

2. History of Related Art

Figure 1:
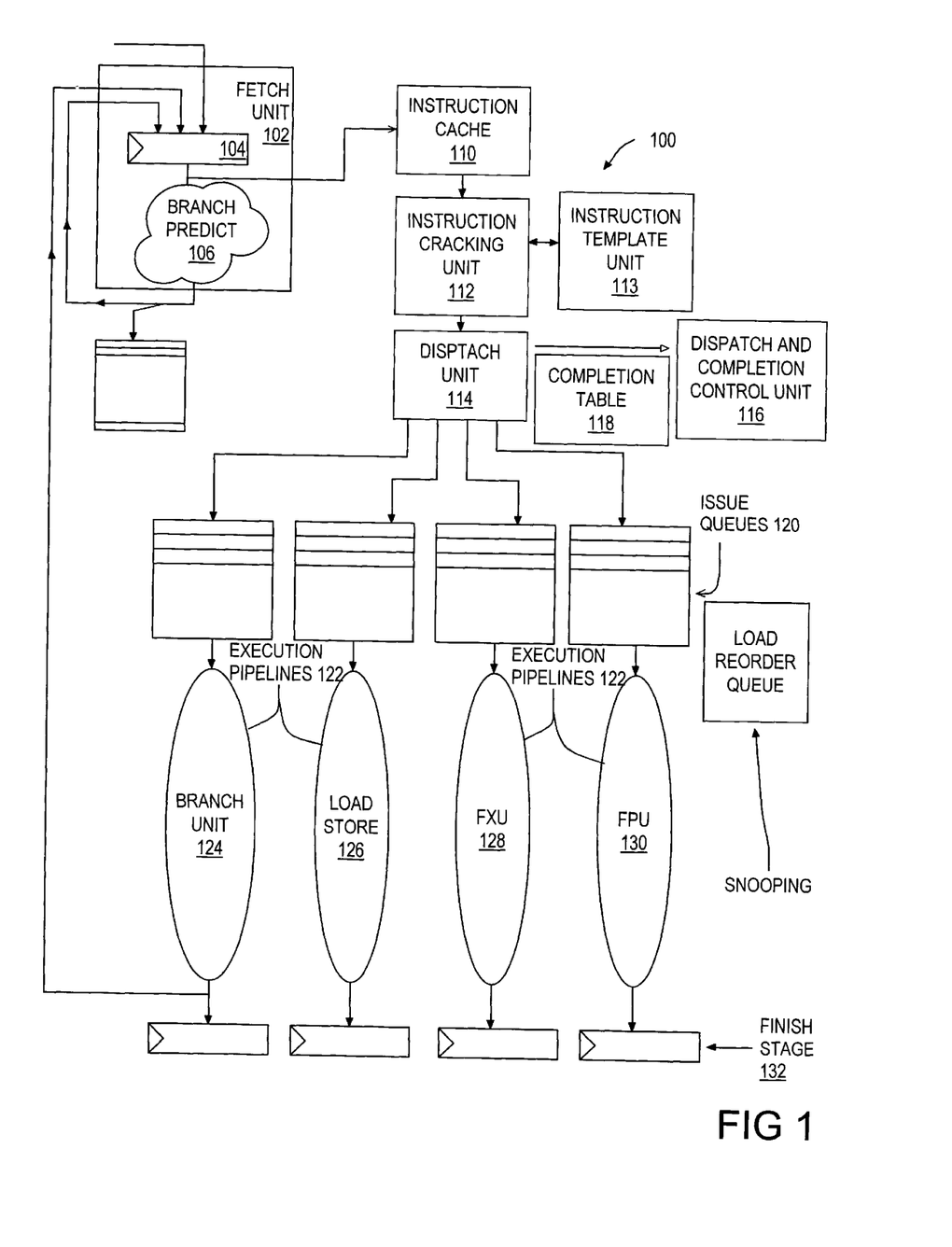
FIG. 1 is a simplified block diagram of a microprocessor according to one embodiment of the invention.

Turning now to the drawings, FIG. 1 is a simplified block diagram of a processor 100 according to one embodiment of the present invention. Processor 100 as depicted in FIG. 1 includes an instruction fetch unit 102 suitable for generating an address of the next instruction to be fetched. The fetched instruction address generated by fetch unit 102 is loaded into a next instruction address latch 104 and provided to an instruction cache 110. Fetch unit 102 further includes branch prediction logic 106. As its name suggests, branch prediction logic 106 is adapted to make an informed prediction of the outcome of a decision that affects the program execution flow. The ability to correctly predict branch decisions is a significant factor in the overall ability of processor 100 to achieve improved performance by executing instructions speculatively and out-of-order. The address produced by fetch unit 102 is provided to an instruction cache 110, which contains a subset of the contents of system memory in a high speed storage facility. If the address instruction generated by fetch unit 102 corresponds to a system memory location that is currently replicated in instruction cache 110, instruction cache 110 forwards the corresponding instruction to cracking logic 112. If the instruction corresponding to the instruction address generated by fetch unit 102 does not currently reside in instruction cache 110, the contents of instruction cache 110 must be updated with the contents of the appropriate locations in system memory before the instruction can be forwarded to cracking logic 112.

SUMMARY OF THE INVENTION

The problems identified above are addressed by a microprocessor and an associated 10 method of operation. The processor includes a fetch unit, an instruction cracking unit, and dispatch and completion control logic. The fetch unit is configured to retrieve a set of instructions from an instruction cache. The instruction cracking unit is configured to receive the set of fetched instructions and adapted to organize the set of instructions into an instruction group. The dispatch and completion logic is adapted to assign a group tag to the instruction group and record the group tag in an entry of the completion table for tracking the completion status of the instructions comprising the instruction group. In one embodiment, the set of fetched instructions are formatted according to a first instruction format and wherein the method further comprises modifying the format of the fetched instructions to a second instruction format prior to execution, where the width of the second instruction format is wider than the width of the first instruction format. In one embodiment, the cracking unit is adapted to break down complex instructions in the set of fetched instructions into multiple simple instructions in an instruction group. In one embodiment, the cracking unit is adapted to break down a load multiple instruction into a set of simple instructions spanning multiple instruction groups. In one embodiment, the cracking unit is adapted to reserve the last entry in the instruction group for instructions with a high exception probability such as a branch instruction. In one embodiment, the dispatch and control logic is adapted to record a single instruction address in the completion table entry corresponding to the each instruction group. Preferably, the single instruction address is the instruction address of the first instruction in the instruction group. In one embodiment, the processor is configured to flush the instruction group in response to detecting an exception generated by an instruction in the instruction group. Preferably, the processor is further configure to disable the group organization facility of the cracking unit prior to reissuing the flushed instructions in response to determining that the exception was generated by an instruction occupying an interior slot in the instruction group .

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED
EMBODIMENT OF THE PRESENT INVENTION

Turning now to the drawings, FIG. 1 is a simplified block diagram of a processor 100 according to one embodiment of the present invention. Processor 100 as depicted in FIG. 1 includes an instruction fetch unit 102 suitable for generating an address of the next instruction to be fetched. The fetched instruction address generated by fetch unit 102 is loaded into a next instruction address latch 104 and provided to an instruction cache 110. Fetch unit 102 further includes branch prediction logic 106. As its name suggests, branch prediction logic 106 is adapted to make an informed prediction of the outcome of a decision that effects the program execution flow. The ability to correctly predict branch decisions is a significant factor in the overall ability of processor 100 to achieve improved performance by executing instructions speculatively and out-of-order. The address produced by fetch unit 102 is provided to an instruction cache 110, which contains a subset of the contents of system memory in a high speed storage facility. If the address instruction generated by fetch unit 102 corresponds to a system memory location that is currently replicated in instruction cache 110, instruction cache 110 forwards the corresponding instruction to cracking logic 112. If the instruction corresponding to the instruction address generated by fetch unit 102 does not currently reside in instruction cache 110, the contents of instruction cache 110 must be updated with the contents of the appropriate locations in system memory before the instruction can be forwarded to cracking logic 112.

Cracking logic 112 is adapted to modify an incoming instruction stream to produce a set of instructions optimized for executing in an underlying execution pipeline at extremely high operating frequencies (i.e., operating frequencies of approximately 1 GHz). In one embodiment, for example, cracking logic 112 receives instructions in a 32-bit wide format such as the instruction set supported by the PowerPC® microprocessor. Detailed information regarding the PowerPC® instruction set is available in the PowerPC 620 RISC Microprocessor User's Manual available from Motorola, Inc. (Order No. MPC620UM/AD), which is incorporated by reference herein. In one embodiment, the format of the instructions generated by cracking logic 112 include explicit fields for information that is merely implied in the format of the fetched instructions such that the format of instructions generated by cracking logic 112 is wider than the format of instructions. In one embodiment, for example, the fetched instructions are encoded according to a 32-bit instruction format and the format of instructions generated by cracking logic 112 is 64 or more bits wide. Cracking logic 112 is designed to generate these wide instructions according to a predefined set of cracking rules. The wide instructions generated by cracking logic 112 facilitate high speed execution by including explicit references to instruction operands.

Figure 2:
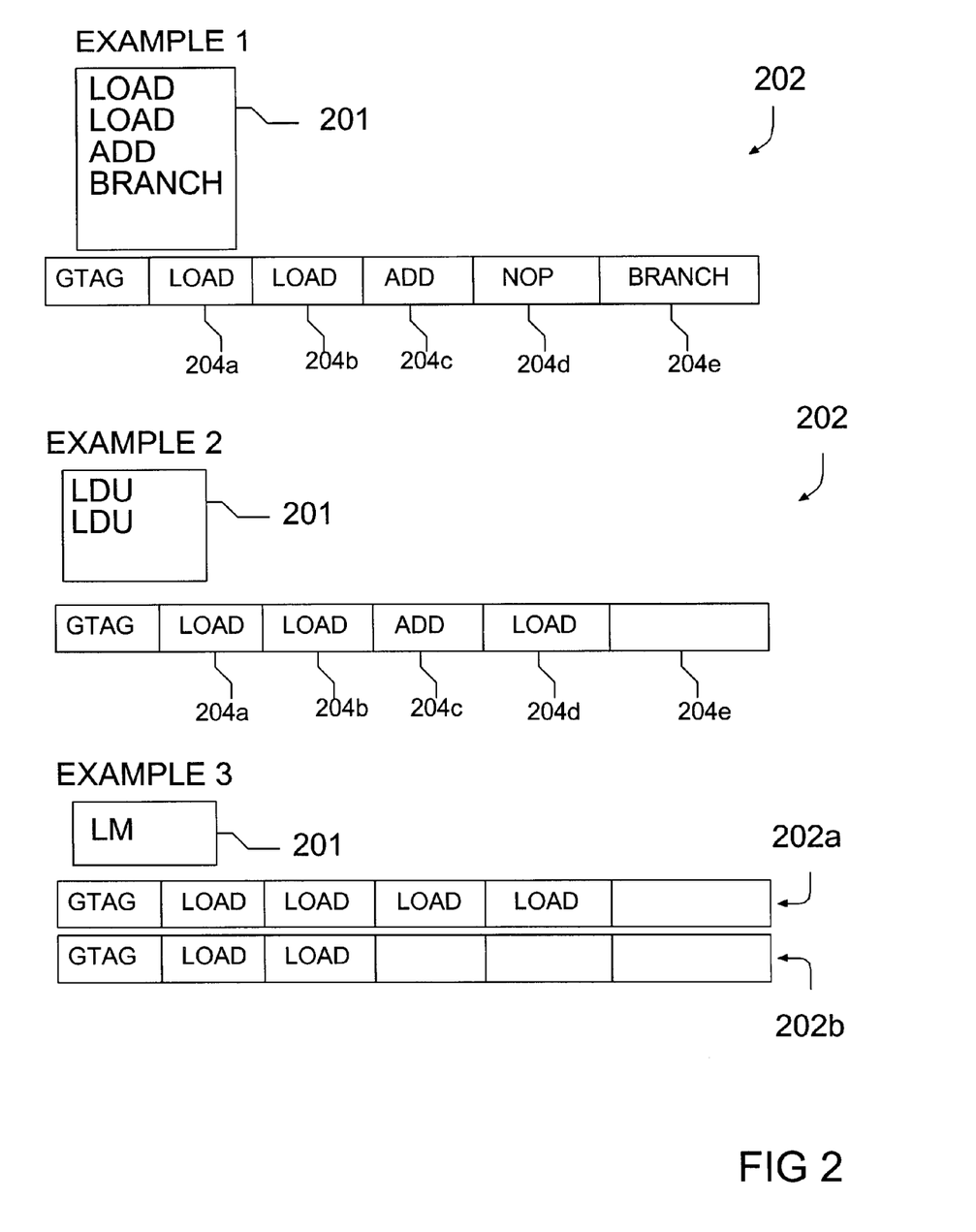
FIG. 2 depicts examples the operation of a group organization facility of the cracking unit of the processor of FIG. 1.

In one embodiment, cracking logic 112 as contemplated herein is designed to organize a set of fetched instructions into instruction "groups" 202, examples of which are depicted in FIG. 2. Each instruction group 202 includes a set of instruction slots 204a, 204b, etc. (collectively or generically referred to as instruction slots 204). The organization of a set of instructions into instruction groups facilitates high speed execution by, among other things, simplifying the logic needed to maintain completion tables for a large number of in-flight instructions. In one embodiment, the instruction address of just a single instruction in the instruction group 202 is maintained during the pendency of the instruction group (i.e., during the time when the instructions in instruction group 202 are in flight). In the preferred embodiment, the single instruction address that is retained is the address of the instruction stored in first slot 204a of instruction group 202. In this embodiment, the regeneration of an instruction address for any instruction other than the instructions stored in first slot 204a will require additional effort because the instruction addresses for all other instructions in instruction group 202 have been discarded. In FIG. 2, three examples of instruction grouping that may be performed by cracking logic 112 are depicted. In Example 1, a set of instructions indicated by reference numeral 201 is transformed into a single instruction group 202 by cracking logic 112. In the depicted embodiment of the invention, each instruction group 202 includes five slots indicated by reference numerals 204a, 204b, 204c, 204d, and 204e. Each slot 204 may contain a single instruction. In this embodiment, each instruction group may include a maximum of five instructions. The use of instruction groups simplifies renaming recovery and completion table logic by reducing the number of instructions that must be individually tagged and tracked. The use of instruction groups thus contemplates sacrificing some information about each instruction in an effort to simplify the process of tracking pending instructions in an out-of-order processor. One implication of this arrangement is that it will not always be possible to determine the instruction address of an instruction in an instruction group 202. More specifically, in the preferred embodiment, the only instruction address that is maintained is the address of the first instruction in the instruction group. As long as instructions are executing and completing without generating exceptions, the instruction address information is not necessary for the proper execution of the program and, therefore, the sacrifice of this information is generally acceptable if the "exception probability" of each instruction is relatively low. Arithmetic instructions such as ADD instructions have an exception probability that is essentially equal to zero. Memory reference instructions such as load and store instructions may cause exceptions under a variety of circumstances, such as when, as an example, a required memory reference is not available in the processor's data cache. A number of techniques are well known, however, to reduce the probability of such cache miss exceptions, address translations exceptions, and other types of exceptions that memory reference instructions may generate. Branch instructions, on the other hand, tend to have a relatively high exception probability due to their speculative nature. To address the relatively high exception probability of branch instructions, one embodiment of processor 100 mandates that the last slot in instruction group 202 (slot 204e in the depicted embodiment) is reserved for branch instructions only. This requirement is met in the Example 1 depicted in FIG. 2 by inserting a NOP in slot 204d between the ADD instruction and the branch instruction. By placing instructions with a high exception probability, such as branch instructions, in the last available slot 204 of group 202, cracking logic 112 guarantees that the instruction address of an instruction that follows a branch instruction will be in the first slot of a subsequent instruction group thereby guaranteeing that the instruction address of an instruction following a branch is readily available in case the branch was mispredicted.

A second example of grouping preformed by cracking logic 112 according to one embodiment of the invention is shown in Example 2 of FIG. 2. This example demonstrates the capability of cracking logic 112 to break down complex instructions into a group of simple instructions for higher speed execution. In the depicted example, a sequence of two load-with-update (LDU) instructions are broken down into an instruction group including a pair of load instructions in slots 204a and 204c respectively and a pair of ADD instructions in slots 204b and 204d respectively. In this example, because group 202 does not contain a branch instruction, the last slot 204e of instruction group 202 contains no instruction. The PowerPC® load-with-update instruction, like analogous instructions in other instruction sets, is a complex instruction in that the instruction affects the contents of multiple general purpose registers (GPRs). Specifically, the load-with-update instruction can be broken down into a load instruction that affects the contents of a first GPR and an ADD instruction that affects the contents of a second GPR. Thus, in instruction group 202 of example two in FIG. 2, instructions in two or more instruction slots 204 correspond to a single instruction received by cracking unit 112. In Example 3, a single instruction entering cracking unit 112 is broken down into a set of instructions occupying multiple groups 202. More specifically, Example 3 illustrates a load multiple (LM) instruction.

The load multiple instruction (according to the PowerPC® instruction set) loads the contents of consecutive locations in memory into consecutively numbered GPRs. In the depicted example, a load multiple of six consecutive memory locations breaks down into six load instructions.

Because each group 202 according to the depicted embodiment of processor 100 includes, at most, five instructions, and because the fifth slot 204e is reserved for branch instructions, a load multiple of six registers breaks down into two groups 202a and 202b respectively. Four of the load instructions are stored in the first group 202a while the remaining two load instructions are stored in the second group 202b. Thus, in Example 3, a single instruction is broken down into a set of instructions that span multiple instruction groups 202.

Returning now to FIG. 1, the wide instructions generated in the preferred embodiment of cracking unit 112 are forwarded to dispatch unit 114. Dispatch unit 114 is responsible for determining which instructions are capable of being executed and forwarding these executable instructions to issue queues 120. In addition, dispatch unit 114 communicates with dispatch and completion control logic 116 to keep track of the order in which instructions were issued and the completion status of these instructions to facilitate out-of-order execution. In the embodiment of processor 100 in which cracking unit 112 organizes incoming instructions into instruction groups as discussed above, each instruction group 202 is assigned a group tag (GTAG) by completion and control logic 116 that conveys the ordering of the issued instruction groups. As an example, dispatch unit 114 may assign monotonically increasing values to consecutive instruction groups.

Figure 3:
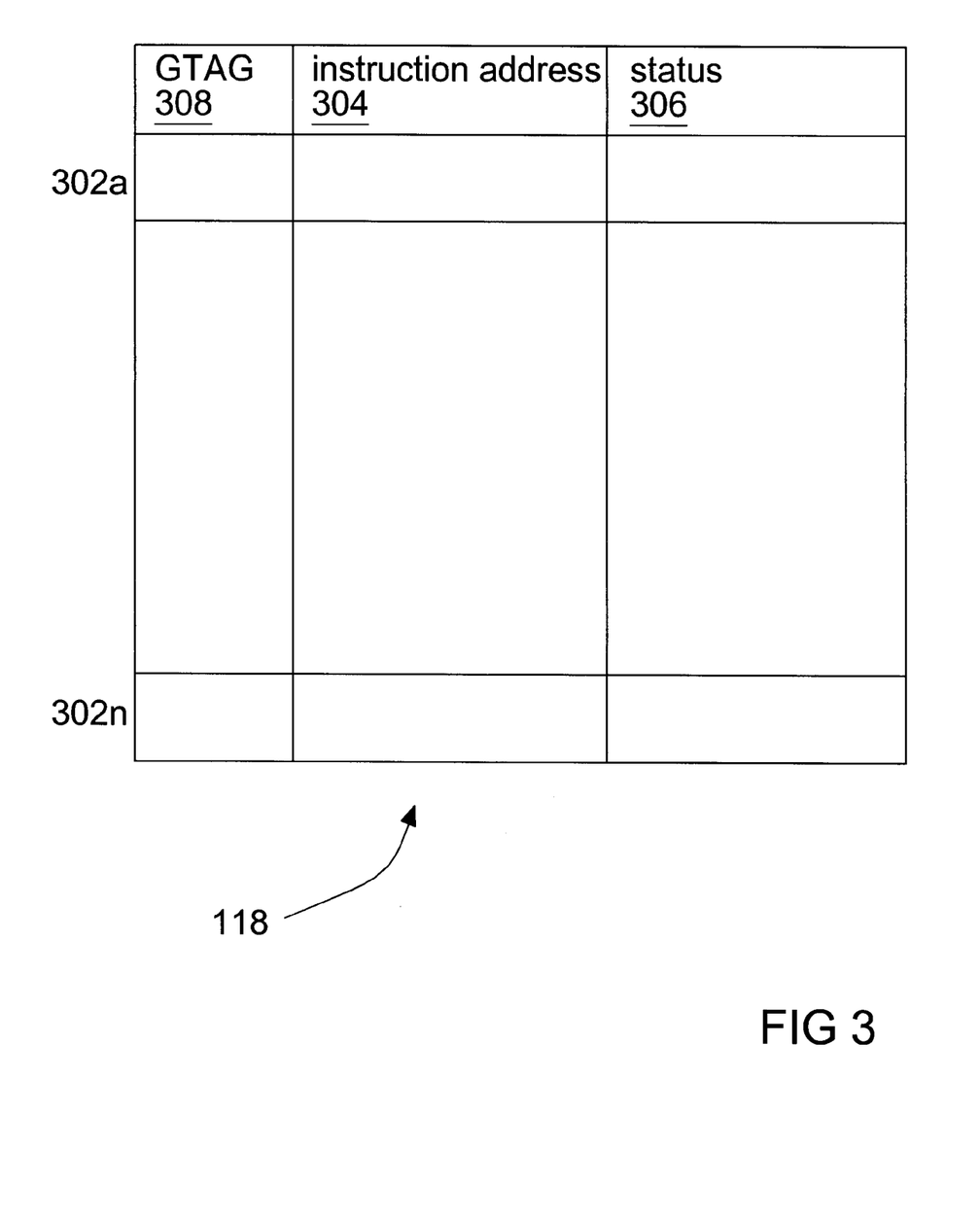
FIG. 3 is a simplified representation of a completion table according to first embodiment of the present invention.
Figure 5:
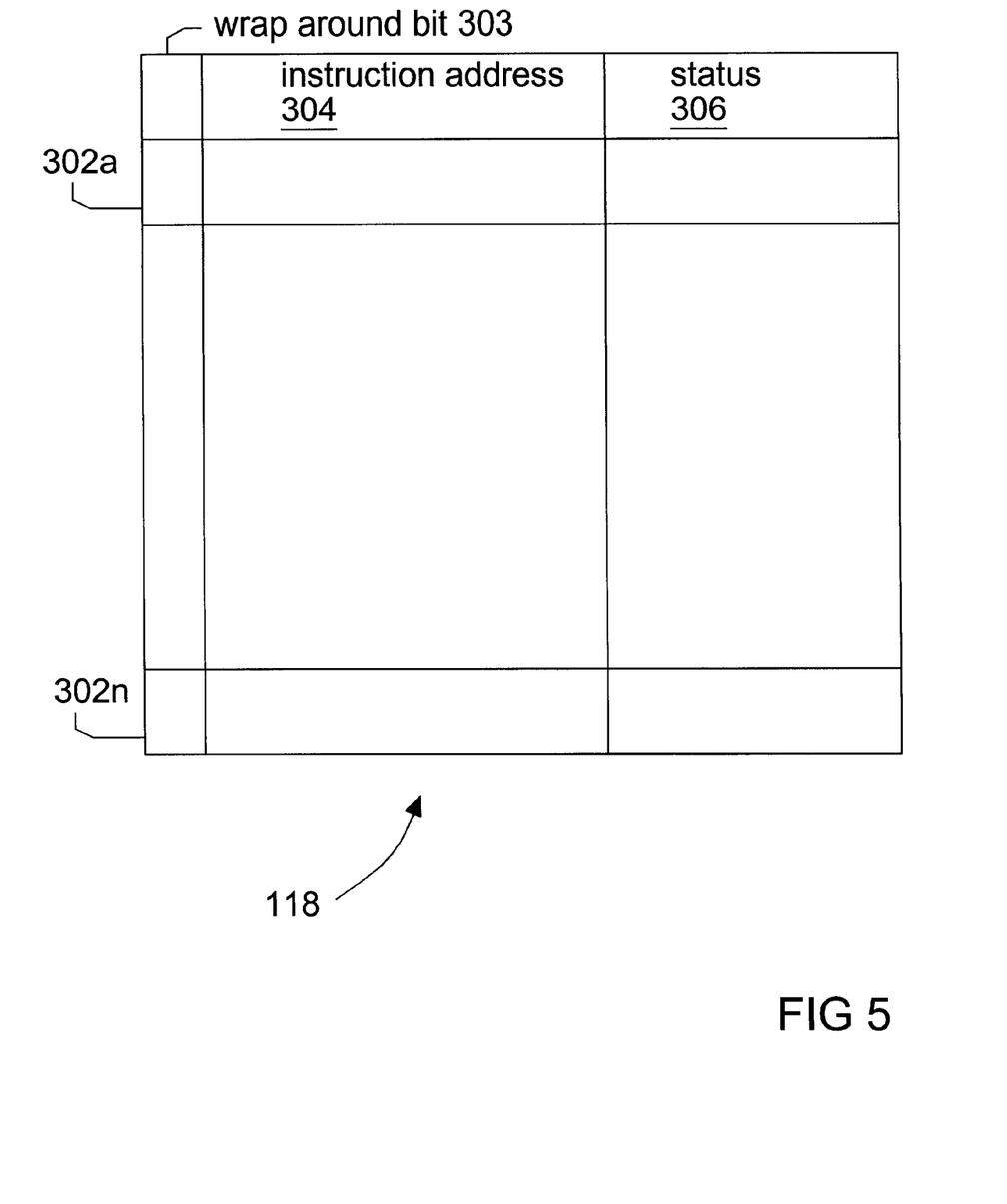
FIG. 5 is a simplified representation of a completion table according to second embodiment of the present invention.

With this arrangement, instruction groups with lower GTAG values are known to have issued prior to (i.e., are younger than) instruction groups with larger GTAG values. In association with dispatch and completion control logic 116, a completion table 118 is utilized in one embodiment of the present invention to track the status of issued instruction groups. Turning to FIGS. 3 and 5, simplified block diagrams of completion table 118 according to alternative embodiments are presented. In the embodiment depicted in FIG. 3, completion table 118 includes a set of entries 302a through 302n (collectively or generically referred to herein as completion table entries 302).

In this embodiment, each entry 302 in completion table 118 includes a GTAG field 308, an instruction address (IA) field 304 and a status bit field 306. Each GTAG field 308 contains the GTAG value of a corresponding instruction group 202. In another embodiment of completion table 118 (depicted in FIG. 5), the GTAG field 308 is eliminated. In this embodiment, the GTAG value is constrained to an integer less than or equal to the number of entries 302 in completion table 118. The GTAG value itself identifies the entry 302 in which the corresponding instruction group resides. Thus, the instruction group stored in entry 1 of completion table 118 will have a GTAG value of 1. In this embodiment of completion table 118 completion table 118 may further include a "wrap around" bit 303 to indicate that an instruction group with a lower GTAG value is actually younger than an instruction group with a higher GTAG value. In one embodiment, the instruction address field 304 includes the address of the instruction in first slot 204a of the corresponding instruction group 202. Status field 306 may contain one or more status bits indicative of whether, for example, the corresponding entry 302 in completion table 118 is available or if the entry has been allocated to a pending instruction group.

In the embodiment of processor 100 depicted in FIG. 1, instructions are issued from dispatch unit 114 to issue queues 120 where they await execution in corresponding execution pipes 122. Processor 100 may include a variety of types of executions pipes, each designed to execute a subset of the processor's instruction set. In one embodiment, execution pipes 122 may include a branch unit pipeline 124, a load store pipeline 126, a fixed point arithmetic unit 128, and a floating point unit 130. Each execution pipe 122 may comprise two or more pipeline stages. Instructions stored in issue queues 120 may be issued to execution pipes 122 using any of a variety of issue priority algorithms. In one embodiment, for example, the oldest pending instruction in an issue queue 120 is the next instruction issued to execution pipes 122. In this embodiment, the GTAG values assigned by dispatch unit 114 are utilized to determine the relative age of instructions pending in the issue queues 120. When an instruction is ultimately forwarded from issue queues 120 to the appropriate execution pipe, the execution pipe performs the appropriate operation as indicated by the instruction's opcode and writes the instruction's result to the instruction's rename GPR by the time the instruction reaches a finish stage (indicated by reference numeral 132) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If it is determined that one or more instructions older than a finished (but not yet completed) instruction generated an exception, the instruction generating the exception and all younger instructions are flushed a rename recovery routine is invoked to return the GPRs to valid value.

Figure 4:
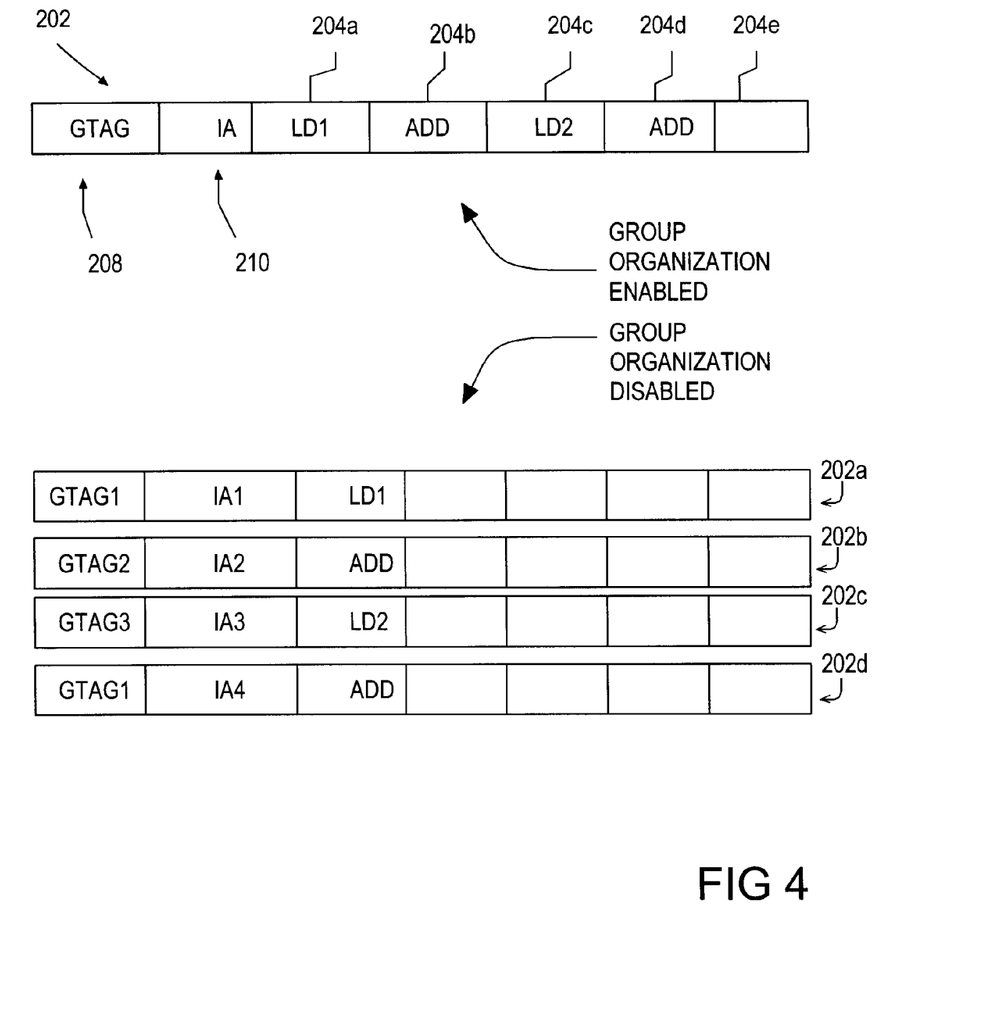
FIG. 4 is illustrates operation of the processor of FIG. 1 when an instruction in and instruction group generates an exception.

Turning now to FIG. 4, a conceptualized representation illustrating the operation of microprocessor 100 when an instruction in one of the instruction groups 202 generates an exception is presented. FIG. 4 depicts an instruction group 202 that includes a first load instruction (LD1) in first slot 204a, an ADD instruction in second slot 204b, a second load instruction (LD2) in third slot 204c, and an ADD instruction in fourth slot 204d. Also illustrated with respect to instruction group 202 is a GTAG 208 and an instruction address 210. GTAG 208 is assigned by dispatch and completion control logic 118 and stored in GTAG field 302 of completion table 118. Instruction address 210 is stored in IA field 304 of completion table 118 to facilitate tracking of instruction group 202 while its component instructions are in flight.

Instruction address 210 of group 202 corresponds to the instruction address of the instruction in the first slot 204a of group 202. Thus, instruction address 210 corresponds to the LD1 instruction in first slot 204a in the depicted example. During subsequent execution, an instruction other than the LD1 instruction in first slot 204a may generate an exception. In the example depicted in FIG. 4, the LD2 instruction stored in slot 204c may generate any of a variety of exceptions including, address translation exceptions, cache miss exceptions, and a variety of other exception conditions.

When an instruction generates an exception, processor 100 must record the instruction address of the instruction that generated the exception (the exception instruction) so that the instruction pointer can be set to the address of the exception instruction after the exception is handled. Because, however, instruction address information for all instructions in instruction group 202 other than the instruction in first slot 204a has been discarded in an attempt to simplify the dispatch and completion management in processor 100, the instruction address of the LD2 instruction is unavailable. The embodiment of processor 100 contemplated herein is designed to address this problem by flushing instruction group 202 (and any instruction group with a GTAG value higher than GTAG 208 of instruction group 202) in response to detecting an exception generated by any instruction with a GTAG value equal to GTAG 208. Thereafter, the code sequence is restarted by setting the instruction pointer to the instruction address indicated by instruction address 210. Prior to re-executing the flushed instructions, processor 100 disables the group organization mode of cracking logic 112 that assembles multiple instructions into instruction groups 202 as described previously. With group organization mode disabled, each fetched instruction will be allocated to its own entry in completion table 118. In this manner, the instruction address of each fetched instruction is maintained while the instructions are in flight. FIG. 4 depicts a representation of the set of instructions generated by cracking logic 112 after group organization mode is disabled following an exception taken by the load instruction stored in slot 204c of instruction group 202. With group organization mode disabled, cracking unit 112 generates a set of four instruction "groups" for the set of instructions that was organized into the instruction group 202 of FIG. 4 prior to disabling group organization mode. The four instruction groups 202a through 202d generated by cracking unit 112 after disabling group organization mode each include a single instruction in slot 204a and no instructions in the remaining slots 204b through 204d. Each group 202a through 202d produced with group organization mode disabled has its own corresponding GTAG and instruction address values. Thus, the LD2 instruction that was assigned to slot 204c of instruction group 202 when group organization mode was enabled is reissued as its own instruction group 202c after group organization mode is disabled. When the LD2 instruction is executed, it will either generate the same exception that it generated when it was executed the first time, in which case the instruction address corresponding to the LD2 instruction is stored in the instruction address field of group 202, or the instruction will complete without exception in which case no harm has been done by executing with group organization mode disabled other than the slight performance penalty that results from executing with group mode disabled. If the LD2 instruction does generate the same exception that it generated the first time it was executed, the instruction address corresponding to the LD2 instruction is readily available and normal exception handling is performed. After the exception has been handled, the group organization mode can be enabled to return to high performance instruction. Thus, in the preferred embodiment, cracking unit 112 includes facilities for disabling (and enabling) the organization of multiple instructions into a single instruction group. In one embodiment, the group organization mode is disabled in response to detecting an interrupt generated by an instruction that occupied an interior slot in an instruction group. For the purposes of this disclosure, an interior instruction slot refers to any slot 204 in an instruction group 202 other than the first instruction slot 204a.

It will therefore be appreciated that the depicted embodiment of processor 100 includes facilities for organizing a set of instructions into an instruction group with a common group tag to simplify dispatch and completion control logic. This simplification enables processor 100 to track an increased number of in-flight instructions without significantly increasing the complexity of the hardware required to track the status of the pending instructions. Processor 100 further includes the ability to disable this group organization mode when an exception corresponding to an instruction from an interior instruction slot is detected. After disabling group organization mode, the instruction that resulted in the exception is reissued and re-executed with group organization mode disabled so that the instruction address of the instruction generating the exception is maintained during the pendency of the instruction to facilitate conventional exception handling. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of operating a microprocessor, comprising:
   fetching a set of instructions;
   organizing the set of instructions as an instruction group wherein each instruction in the instruction group shares a common group tag indicative of the ordering of the instruction group relative to other instruction groups;
   assigning an entry in a completion table to the instruction group to track the completion status of the instruction group as the instructions in the instruction group are executed and recording the instruction group tag in the completion table; and
   recording, in the completion table, the instruction address of the instruction in a first slot of the instruction group.

2. The method of claim 1, further comprising maintaining the completion table entry corresponding to the instruction group tag until each instruction in the instruction group has completed and, thereafter, releasing the entry in the completion table.

3. The method of claim 1, wherein the set of fetched instructions are formatted according to a first instruction format and wherein the method further comprises modifying the format of the instructions to a second instruction format prior to execution.

4. The method of claim 1, wherein the set of fetched instructions includes a complex instruction and further wherein the organizing of the set of instructions includes breaking down the complex instruction into multiple simple instructions in the instruction group whereby a single fetched instruction corresponds to multiple instructions in the instruction group.

5. The method of claim 4, wherein the complex instruction comprises a load multiple instruction and further wherein the load multiple instruction is broken down into multiple simple instructions spanning multiple instruction groups.

6. The method of claim 1, further comprising reserving a last slot in the instruction group for branch instructions.

7. The method of claim 1, further comprising, responsive to detecting an exception generated by an instruction in the instruction group during execution of the instructions, flushing the instruction group and all other younger instruction groups.

8. The method of claim 7, further comprising responsive to flushing the instruction group, disabling group organization mode prior to issuing the set of instructions following the exception, wherein an instruction tag and instruction address is recorded in the completion table for each instruction.

9. A method of operating a microprocessor, comprising:

fetching a set of instructions;

organizing the set of instructions as an instruction group wherein each instruction in the instruction group shares a common group tag indicative of the ordering of the instruction group relative to other instruction groups;

assigning an entry in a completion table to the instruction group to track the completion status of the instruction group as the instructions in the instruction group are executed and recording the instruction group tag in the completion table;

wherein the set of fetched instructions are formatted according to a first instruction format and wherein the method further comprises modifying the format of the instructions to a second instruction format prior to execution, wherein implied operand references in the first instruction format are converted to explicit operand references in the second instruction format.

10. A microprocessor, comprising:

a fetch unit configured to generate an address of the next instruction to be fetched and to provide the generated address to an instruction cache thereby causing the cache to output a set of instructions corresponding to the generated address;

a cracking unit configured to receive the set of fetched instructions and including a group organization facility adapted to organize the set of instructions into an instruction group;

dispatch and completion logic adapted to assign a group tag to the instruction group and record the group tag in an entry of the completion table for tracking the completion status of the instructions comprising the instruction group and further adapted to record the instruction address of the first instruction in the instruction group in the completion table entry corresponding to the each instruction group, wherein the dispatch and control logic is adapted to record a single instruction address in the completion table entry corresponding to the each instruction group.

11. The processor of claim 10, wherein at least one of the fetched instructions are formatted according to a first instruction format and wherein the cracking unit is further adapted to modify the format of at least one of the set of instructions to a second instruction format prior to execution.

12. The processor of claim 10, wherein the set of instructions includes a complex instruction and further wherein the cracking unit is adapted to break down the complex instruction into multiple simple instructions such that a single fetched instruction corresponds to multiple instructions in the instruction group.

13. The processor of claim 12, wherein the complex instruction comprises a load multiple instruction and further wherein the cracking unit is adapted to break down the load multiple instruction into a set of simple instructions spanning multiple instruction groups.

14. The processor of claim 10, wherein the cracking unit is adapted to reserve the last entry in the instruction group for branch instructions.

15. The processor of claim 10, wherein the processor is further configured to flush the instruction group in response to detecting an exception generated by an instruction in the instruction group.

16. The processor of claim 10, wherein the processor is further configured to disable the group organization facility of the cracking unit in response to determining that the exception was generated by an instruction occupying an interior slot in the instruction group.

17. A microprocessor, comprising:

a fetch unit configured to generate an address of the next instruction to be fetched and to provide the generated address to an instruction cache thereby causing the cache to output a set of instructions corresponding to the generated address;

a cracking unit configured to receive the set of fetched instructions and including a group organization facility adapted to organize the set of instructions into an instruction group; and dispatch and completion logic adapted to assign a group tag to the instruction group and record the group tag in an entry of the completion table for tracking the completion status of the instructions comprising the instruction group;

wherein at least one of the fetched instructions are formatted according to a first instruction format and wherein the cracking unit is further adapted to modify the format of at least one of the set of instructions to a second instruction format prior to execution;

wherein the implied operand references in the first instruction format are converted to explicit operand references in the second instruction format.

* * * * *

UNITED STATES PATENT AND TRADEMARK OFFICE
CERTIFICATE OF CORRECTION

PATENT NO.    : 6,654,869 B1
DATED         : November 25, 2003
INVENTOR(S)   : James Allan Kahle, Hung Qui Le and Charles Roberts Moore It is certified that error appears in the above-identified patent and that said Letters Patent is hereby corrected as shown below:

Column 2,
Line 54, paragraph should read as follows:
-- Turning now to the drawings, FIG 1 is a simplified block diagram of a processor 100 according to one embodiment of the present invention. Processor 100 as depicted in FIG 1 includes an instruction fetch unit 102 suitable for generating an address of the next instruction to be fetched. The fetched instruction address generated by fetch unit 102 is loaded into a next instruction address latch 104 and provided to an instruction cache 110. Fetch unit 102 further includes branch prediction logic 106. As its name suggests, branch prediction logic 106 is adapted to make an informed prediction of the outcome of a decision that affects the program execution flow. The ability to correctly predict branch decisions is a significant factor in the overall ability of processor 100 to achieve improved performance by executing instructions speculatively and out-of-order. The address produced by fetch unit 102 is provided to an instruction cache 110, which contains a subset of the contents of system memory in a high speed storage facility. If the address instruction generated by fetch unit 102 corresponds to a system memory location that is currently replicated in instruction cache 110, instruction cache 110 forwards the corresponding instruction to cracking logic 112. If the instruction corresponding to the instruction address generated by fetch unit 102 does not currently reside in instruction cache 110, the contents of instruction cache 110 must be updated with the contents of the appropriate locations in system memory before the instruction can be forwarded to cracking logic 112. --

Signed and Sealed this

Sixth Day of July, 2004

JON W. DUDAS
*Acting Director of the United States Patent and Trademark Office*